(12) United States Patent
Choi

(10) Patent No.: US 8,542,110 B2
(45) Date of Patent: Sep. 24, 2013

(54) MOBILE TERMINAL AND OBJECT DISPLAYING METHOD USING THE SAME

(75) Inventor: Yeong June Choi, Jeollabuk-do (KR)

(73) Assignee: LG Electronics Inc., Seoul (KR)

( * ) Notice: Subject to any disclaimer, the term of this patent is extended or adjusted under 35 U.S.C. 154(b) by 744 days.

(21) Appl. No.: 12/534,784

(22) Filed: Aug. 3, 2009

(65) Prior Publication Data

US 2010/0060475 A1    Mar. 11, 2010

(30) Foreign Application Priority Data

Sep. 10, 2008  (KR) .................. 10-2008-0089153

(51) Int. Cl.
*G08B 1/08*  (2006.01)

(52) U.S. Cl.
USPC ...... 340/539.11; 340/689; 455/566; 345/156; 345/158; 345/173; 715/863

(58) Field of Classification Search
USPC ................ 340/689, 539.11; 345/156, 158, 345/173; 455/566; 715/769, 771, 782, 784, 715/863

See application file for complete search history.

(56) References Cited

U.S. PATENT DOCUMENTS

| | | | |
|---|---|---|---|
| 2002/0167699 A1* | 11/2002 | Verplaetse et al. | 359/158 |
| 2002/0190947 A1* | 12/2002 | Feinstein | 345/158 |
| 2007/0176898 A1 | 8/2007 | Suh | |
| 2008/0079692 A1 | 4/2008 | Liang et al. | |
| 2008/0207263 A1* | 8/2008 | May et al. | 455/556.2 |
| 2009/0225026 A1* | 9/2009 | Sheba | 345/156 |
| 2009/0262074 A1* | 10/2009 | Nasiri et al. | 345/158 |
| 2010/0064238 A1* | 3/2010 | Ludwig | 715/770 |
| 2010/0214243 A1* | 8/2010 | Birnbaum et al. | 345/173 |
| 2011/0050570 A1* | 3/2011 | Jaiswal et al. | 345/158 |
| 2011/0124376 A1* | 5/2011 | Kim et al. | 455/566 |

FOREIGN PATENT DOCUMENTS

| | | |
|---|---|---|
| CN | 1714326 | 12/2005 |
| CN | 101213509 | 7/2008 |
| EP | 1647875 | 4/2006 |
| EP | 1686450 | 8/2006 |
| EP | 1814019 | 8/2007 |
| EP | 1914622 | 4/2008 |
| JP | 2008-116791 | 5/2008 |

* cited by examiner

*Primary Examiner* — Brent Swarthout
(74) *Attorney, Agent, or Firm* — Lee, Hong, Degerman, Kang & Waimey

(57) ABSTRACT

A display method for a mobile terminal includes displaying an active object on a display of a mobile terminal, the active object being able to be manipulated by a user, and detecting a degree of tilt of the mobile terminal relative to a reference plane. The method further includes responsive to the detecting of the degree of tilt, displaying a selectable plurality of inactive objects on the display, highlighting an object of the plurality of inactive objects responsive to user touch input relative to an associated one of the plurality of inactive objects, and deactivating the active object and displaying the highlighted object as a presently active object on the display responsive to user touch input relative to the highlighted object.

26 Claims, 11 Drawing Sheets

MOBILE TERMINAL AND OBJECT DISPLAYING METHOD USING THE SAME

CROSS-REFERENCE TO RELATED APPLICATIONS

Pursuant to 35 U.S.C. §119(a), this application claims the benefit of earlier filing date and right of priority to Korean Application No. 2008-0089153, filed on Sep. 10, 2008, the contents of which are hereby incorporated by reference herein in their entirety.

FIELD OF THE INVENTION

The present invention relates to a mobile terminal, and more particularly, to a mobile communication terminal and method for displaying objects.

DISCUSSION OF THE RELATED ART

Generally, terminals can be classified into mobile/portable terminals and stationary terminals. The mobile terminals can be classified into handheld terminals and vehicle mounted terminals according to the portability of the device.

As functions of mobile terminals have diversified, mobile terminals are now implemented as multimedia players provided with composite functions, such as photographing still or moving pictures, playing of music or moving picture files, playing games, broadcasting reception and other functions known in the art.

To support and increase terminal functions, it may be necessary to consider the improvement of structural parts and/or software parts of the terminal.

SUMMARY OF THE INVENTION

According to an embodiment of the invention, there is a display method for a mobile terminal. The method includes displaying an active object on a display of a mobile terminal, detecting a degree of tilt of the mobile terminal relative to a reference plane, displaying a selectable plurality of inactive objects on the display in response to detecting the degree of tilt, highlighting an object of the plurality of inactive objects in response to user touch input relative to an associated one of the plurality of inactive objects, and deactivating the active object and displaying the highlighted object as a presently active object on the display in response to user touch input relative to the highlighted object. The active object is capable of being manipulated by a user.

According to another embodiment of the invention, a mobile terminal includes a display that is configured to display an active object on the mobile terminal, and a controller. The active object is capable of being manipulated. The controller is configured to detect a degree of tilt of the mobile terminal relative to a reference plane, display a selectable plurality of inactive objects on the display in response to the detecting of the degree of tilt, highlight an object of the plurality of inactive objects in response to touch input relative to an associated one of the plurality of inactive objects, and deactivate the active object and display the highlighted object as a presently active object on the display in response to touch input relative to the highlighted object.

BRIEF DESCRIPTION OF THE DRAWINGS

The above and other aspects, features, and advantages of the present invention will become more apparent upon consideration of the following description of preferred embodiments, taken in conjunction with the accompanying drawing figures.

DETAILED DESCRIPTION OF THE PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts. The terms 'module' and 'unit', as used herein, may be used interchangeably.

Mobile terminals described in this disclosure can include a mobile phone, a smart phone, a laptop computer, a digital broadcast terminal, a PDA (personal digital assistant), a PMP (portable multimedia player), a navigation system, or other types of mobile terminals known in the art.

Except for a case applicable to mobile terminals only, it is apparent to those skilled in the art that the configurations according to an embodiment described in this disclosure is applicable to such stationary terminals as digital televisions, desktop computers, and other stationary terminals known in the art.

Figure 1:
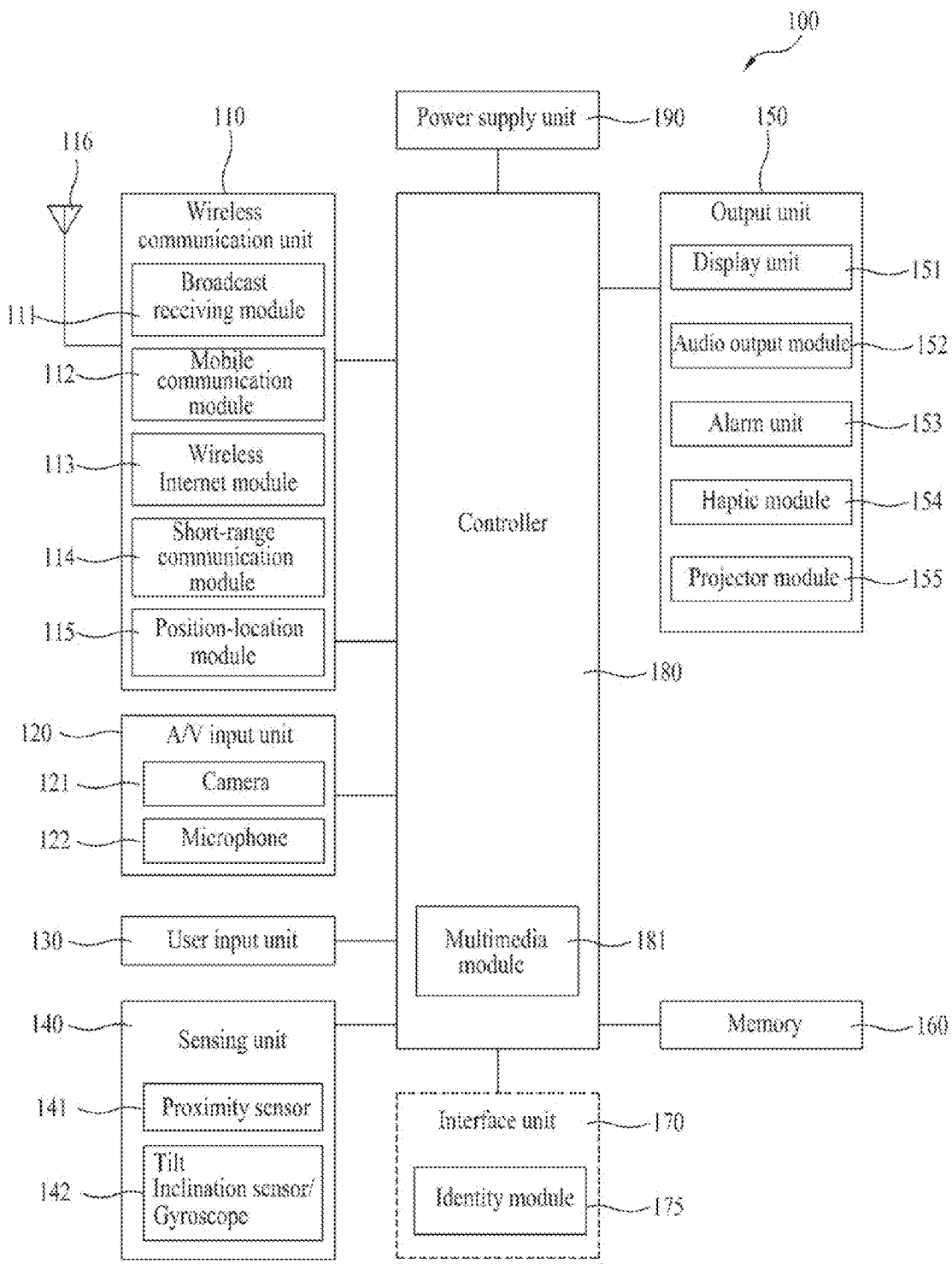
FIG. 1 is a block diagram of a mobile terminal.

Referring to FIG. 1, a mobile terminal 100 includes a wireless communication unit 110, an A/V (audio/video) input unit 120, a user input unit 130, a sensing unit 140, an output unit 150, a memory 160, an interface unit 170, a controller 180, and a power supply unit 190. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

The wireless communication unit 110 typically includes one or more components that permit wireless communication between the mobile terminal 100 and a wireless communication system or network within which the mobile terminal 100 is located. For instance, the wireless communication unit 110 may include a broadcast receiving module 111, a mobile communication module 112, a wireless Internet module 113, a short-range communication module 114, a position-location module 115, or other communication devices known in the art.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server that generates and transmits a broadcast signal and/or broadcast associated information or a server that is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information may include information associated with a broadcast channel, a broadcast program, a broadcast service provider, etc. The broadcast associated information can be provided via a mobile communication network. In this case, the broadcast associated information can be received by the mobile communication module 112.

The broadcast associated information can be implemented in various forms. For instance, broadcast associated information may be an electronic program guide (EPG) of digital multimedia broadcasting (DMB), or may be an electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 may be configured to cooperate with other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transmissions, among others.

The wireless Internet module 113 supports Internet access for the mobile terminal 100. This module may be internally or externally coupled to the mobile terminal 100. In this case, the wireless Internet technology can include WLAN (Wireless LAN), wireless fidelity (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well as the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 may include a camera 121 and a microphone 122. The camera 121 receives and processes image frames of still pictures or video, which are obtained by an image sensor in a video call mode or a photographing mode. The processed image frames can be displayed on the display unit 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition mode. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, the mobile terminal 100 may be configured as a slide-type mobile terminal. In this configuration, the sensing unit 140 may sense whether a sliding portion of the mobile terminal is opened or closed. Other examples include the sensing unit 140 sensing the presence or absence of power provided by the power supply 190, the presence or absence of a coupling or other connection between the interface unit 170 and an external device. The sensing unit 140 may include a proximity sensor 141.

The output unit 150 generates outputs relevant to the senses of sight, hearing, touch and the like. The output unit 150 may include the display unit 151, an audio output module 152, an alarm unit 153, a haptic module 154, a projector module 155 and the like.

The display unit 151 is typically implemented to visually display (output) information associated with the mobile terminal 100. For example, if the mobile terminal is operating in a phone call mode, the display will generally provide a user interface (UI) or graphical user interface (GUI) that includes information associated with placing, conducting, and terminating a phone call. As another example, if the mobile terminal 100 is in a video call mode or a photographing mode, the display unit 151 may additionally or alternatively display images that are associated with these modes, the UI or the GUI.

The display unit 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays may be implemented in a transparent or optical transmissive type, which will also be referred to as a transparent display. As a representative example for the transparent display, there is TOLED (transparent OLED) or the like. A rear configuration of the display unit 151 may be implemented in the optical transmissive type as well. In this configuration, a user is able to see an object in the rear of a terminal body via the area occupied by the display unit 151 of the terminal body.

At least two display units 151 can be provided to the mobile terminal 100 in accordance with the implemented configuration of the mobile terminal 100. For example, a plurality of display units can be arranged on a single face of the mobile terminal 100 in a manner of being spaced apart from each other or being built in one body. Alternatively, a plurality of display units can be arranged on different faces of the mobile terminal 100.

In a case where the display unit 151 and a touch sensor for detecting a touch action form a mutual layer structure together, and are thus implemented as a touchscreen, the display unit 151 may be used as both an input device and an output device. In this case, the touch sensor can be configured as a touch film, a touch sheet, a touchpad or the like.

The touch sensor may be configured to convert a pressure applied to a specific portion of the display unit 151 or a variation of a capacitance generated from a specific portion of the display unit 151 to an electric input signal. Moreover, the touch sensor may be configured to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display unit 151 is touched.

With continued reference to FIG. 1, the sensing unit 140 may include a proximity sensor 141, which may be positioned in an internal area of the mobile terminal 100 enclosed by the touchscreen or around the touchscreen. The proximity sensor 141 is a sensor that detects a presence or non-presence of an object approaching a prescribed detecting surface or an object existing around the proximity sensor using an electromagnetic field strength or infrared ray without mechanical contact. Hence, the proximity sensor 141 has greater durability than a contact type sensor and also has greater utility than the contact type sensor.

The proximity sensor 141 may include one of a transmissive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. When the touchscreen includes the electrostatic capacity proximity sensor, it is configured to detect the proximity of a pointer using a variation of an electric field according to the proximity of the pointer. In this case, the touchscreen (touch sensor) may be classified as the proximity sensor.

In the following description, for the sake of example only, an action where a pointer approaches, without contacting, the touchscreen and is recognized as located on the touchscreen is named 'proximity touch'. An action where a pointer actually touches the touchscreen is named 'contact touch'. The position on the touchscreen proximity-touched by the pointer refers to the position of the pointer that vertically opposes the touchscreen when the pointer performs the proximity touch.

The proximity sensor 141 detects a proximity touch and a proximity touch pattern (e.g., a proximity touch distance, a proximity touch duration, a proximity touch position, a proximity touch shift state, etc.). Information corresponding to the detected proximity touch action and the detected proximity touch pattern can be outputted to the touchscreen.

The audio output module 152 functions in various modes, including a call-receiving mode, a call-placing mode, a recording mode, a voice recognition mode, a broadcast reception mode and the like to output audio data that is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 outputs a signal for announcing the occurrence of a particular event associated with the mobile terminal 100. Typical events include a call received event, a message received event and a touch input received event. The alarm unit 153 is able to output a signal for announcing the event occurrence by way of vibration, as well as by way of video or audio signal. The video or audio signal can be outputted via the display unit 151 or the audio output module 152. Hence, the display unit 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For example, different vibrations can be outputted in a manner of being synthesized together or can be outputted in sequence.

The haptic module 154 is able to generate various tactile effects, as well as the vibration. For example, the haptic module 154 generates the effect attributed to the arrangement of pins vertically moving against a contact skin surface, the effect attributed to the injection/suction power of air though an injection/suction hole, the effect attributed to skimming over a skin surface, the effect attributed to the contact with an electrode, the effect attributed to an electrostatic force, the effect attributed to heat and cold using an endothermic or exothermic device, and other tactile effects known in the art.

The haptic module 154 may be implemented to enable a user to sense the tactile effect through a muscle sense in a finger, arm, or other parts of the body, as well as to transfer the tactile effect via direct contact. Optionally, at least two haptic modules 154 may be provided to the mobile terminal 100 in accordance with the corresponding configuration type of the mobile terminal 100.

The projector module 155 is an element for performing an image projector function using the mobile terminal 100. The projector module 155 is able to display an image, which is identical to or partially different from the image displayed on the display unit 151, on an external screen, wall, or other surface according to a control signal of the controller 180.

In particular, the projector module 155 may include a light source (not shown in the drawing) generating light, such as a laser, for projecting an image externally, an image producing means (not shown in the drawing) for producing an image to output externally using the light generated from the light source, and a lens (not shown in the drawing) for enlarging the output image externally in a predetermined focus distance. The projector module 155 can further include a device (not shown in the drawing) for adjusting an image projected direction by mechanically moving the lens or the whole module.

The projector module 155 can be classified as a CRT (cathode ray tube) module, an LCD (liquid crystal display) module, a DLP (digital light processing) module, or the like. In particular, the DLP module is operated by a mechanism for enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. It is understood that the projector module 155 can be positioned at any portion of the mobile terminal 100 according to the necessity thereof.

The memory 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. A recent use history or a cumulative use frequency of each data, such as a use frequency for each phonebook, each message or each multimedia, can be stored in the memory 160. Moreover, data for various patterns of vibration and/or sound outputted in case of a touch input to the touchscreen can be stored in the memory 160.

The memory 160 may be implemented using any type or combination of suitable volatile and non-volatile memory or storage devices, including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic disk, optical disk, multimedia card micro type memory, card-type memory (e.g., SD memory, XD memory, etc.), or other similar memory or data storage device. The mobile terminal 100 is able to operate in association with a web storage for performing a storage function of the memory 160 on the Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module 175 is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module 175 can be manufactured as a smart card. Therefore, the identity module 175 may be connectible to the mobile terminal 100 via a corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes may be implemented with a software application written in any suitable programming language and may be stored in memory such as the memory 160, and executed by a controller or processor, such as the controller 180.

Figure 2A:
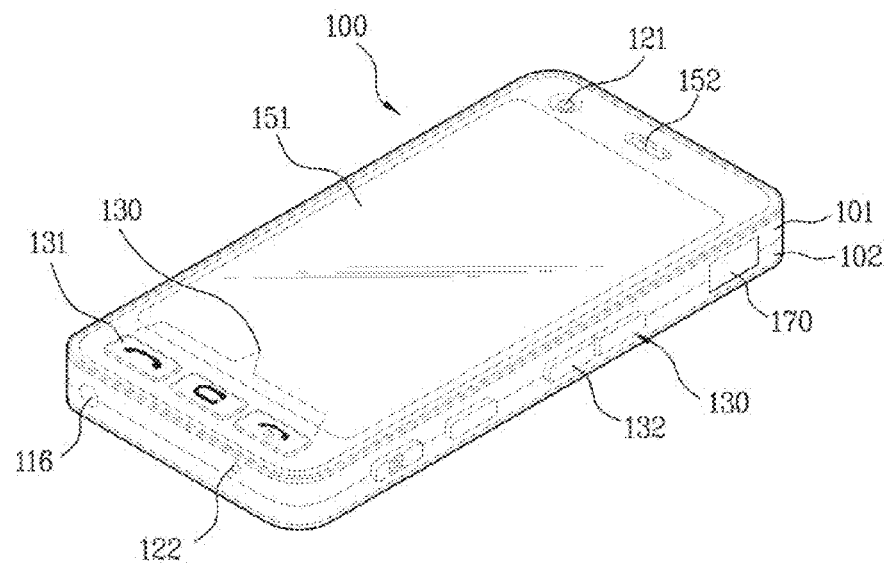
FIG. 2A is a front perspective diagram of a mobile terminal.

Referring to FIG. 2, for example purposes the mobile terminal 100 shown in the drawing has a bar-type terminal body. However, the mobile terminal 100 may be implemented in a variety of different configurations. Examples of such other configurations include folder-type, slide-type, rotational-type, swing-type and combinations thereof. For sake of example only, further disclosure will primarily relate to a bar-type mobile terminal 100. However, such teachings apply equally to other types of mobile terminals.

The mobile terminal 100 includes a case (casing, housing, cover, etc.) configuring an exterior thereof. The case can be divided into a front case 101 and a rear case 102. Various electric/electronic parts are loaded in a space provided between the front and rear cases 101 and 102. Optionally, at least one middle case (not shown) can be provided between the front and rear cases 101 and 102.

The cases 101 and 102 may be formed of a polymeric material, such as by injection molding of synthetic resin, or can be formed of metallic materials, such as stainless steel (CRES) or titanium (Ti), or made of other materials known in the art.

A display, such as a display unit 151, an audio output unit 152, a first camera 121, a user input unit 130, such as a first input unit 131 and a second input unit 132, a microphone 122, an interface unit 170, and/or other devices can be provided in the terminal body, and more particularly, in the front case 101.

The display unit 151 occupies a majority of a main face of the front case 101. The audio output unit 152 and the first camera 121 are positioned at an area adjacent to one end portion of the display unit 151, while the first input unit 131 and the microphone 122 are positioned at another area adjacent to an opposite end portion of the display unit 151. The second input unit 132 and the interface unit 170 may be positioned at lateral sides of the front and rear cases 101 and 102.

The user input unit 130 is manipulated to receive a command for controlling an operation of the terminal 100. The user input unit 130 may include a plurality of manipulating units, such as the first input unit 131 and the second input unit 132. The first and second input units 131 and 132 can be named a manipulating portion and may adopt any mechanism of a tactile manner that enables a user to perform a manipulation action by experiencing a tactile feeling.

Content inputted by the first or second input units 131 or 132 can be diversely set. For example, such commands as START, END, SCROLL, and other commands are inputted via the first manipulating unit 131. A command for a volume adjustment of sound outputted from the audio output unit 152, a command for a switching to a touch recognizing mode of the display unit 151, or other commands can be inputted via the second manipulating unit 132.

Figure 2B:
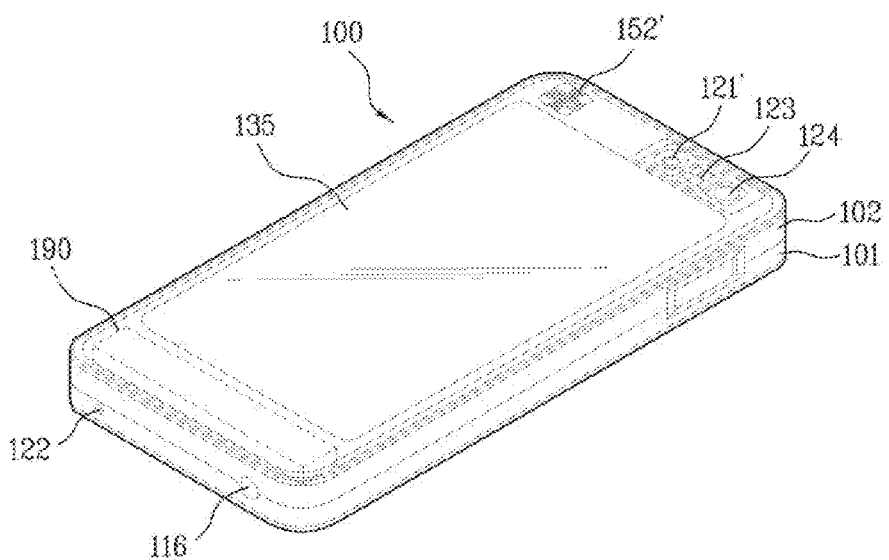
FIG. 2B is a rear perspective diagram of a mobile terminal.

Referring to FIG. 2B, a second camera 121' can be provided at a backside of the terminal body, and more particularly, to the rear case 102. The second camera 121' has a photographing direction that is substantially opposite to that of the first camera 121 shown in FIG. 2A on the front case 101 and may have a pixel density that differs from that of the first camera 121.

For example, the first camera 121 may have a lower pixel density for capturing and transmitting a picture of user's face for a video call, while the second camera 121' may have a higher pixel density for capturing a general subject for photography without transmitting the captured subject. Each of the first and second cameras 121 and 121' can be installed at the terminal body and configured to be rotated or popped up.

A flash 123 and a mirror 124 may be provided adjacent to the second camera 121'. The flash 123 projects light toward a subject when photographing the subject using the second camera 121'. When taking a picture of oneself using the second camera 121', the mirror 124 enables the user to view his/her face as reflected by the mirror 124.

An additional, second audio output unit 152' may be provided at the backside of the terminal body. The additional audio output unit 152' is able to implement a stereo function in combination with the first audio output unit 152, shown in FIG. 2A, and may be used for implementation of a speakerphone mode when talking over the terminal.

A broadcast signal receiving antenna 116 can be provided toward a lateral side of the terminal body, as well as an antenna for communication or the like. The antenna 116 may be a portion of the broadcast receiving module 111 shown in FIG. 1 and may be retractable into the terminal body.

A power supply unit 190 for supplying power to the terminal 100 is provided to the terminal body. The power supply unit 190 may be configured to be built within the terminal body. Alternatively, the power supply unit 190 may be configured to be detachably connected to the terminal body.

A touchpad 135 for detecting a touch may be positioned at the rear case 102. The touchpad 135 may be configured to be a light-transmissive type, similar to the display unit 151. In this case, if the display unit 151 is configured to output visual information from both faces, it is able to recognize the visual information via the touchpad 135 as well. The information outputted from both of the faces may be controlled entirely via the touchpad 135. Alternatively, a display may be provided on the touchpad 135 so that a touchscreen may also be provided at the rear case 102.

The touchpad 135 is activated by interconnecting with the display unit 151 of the front case 101. The touchpad 135 may be provided parallel to the display unit 151. The touchpad 135 may have a size equal to or smaller than that of the display unit 151.

Interconnected operational mechanisms between the display unit 151 and the touchpad 135 are explained with reference to FIG. 3A and FIG. 3B as follows. Various types of visual information can be displayed on the display unit 151. This information can be displayed as characters, numerals, symbols, graphics, icons, or other types of visual information known in the art.

In order to input the information, at least one of the characters, numerals, symbols, graphics, icons, or other type of visual information is represented as a single predetermined array to be implemented in a keypad formation. This keypad formation can be soft keys.

Figure 3A:
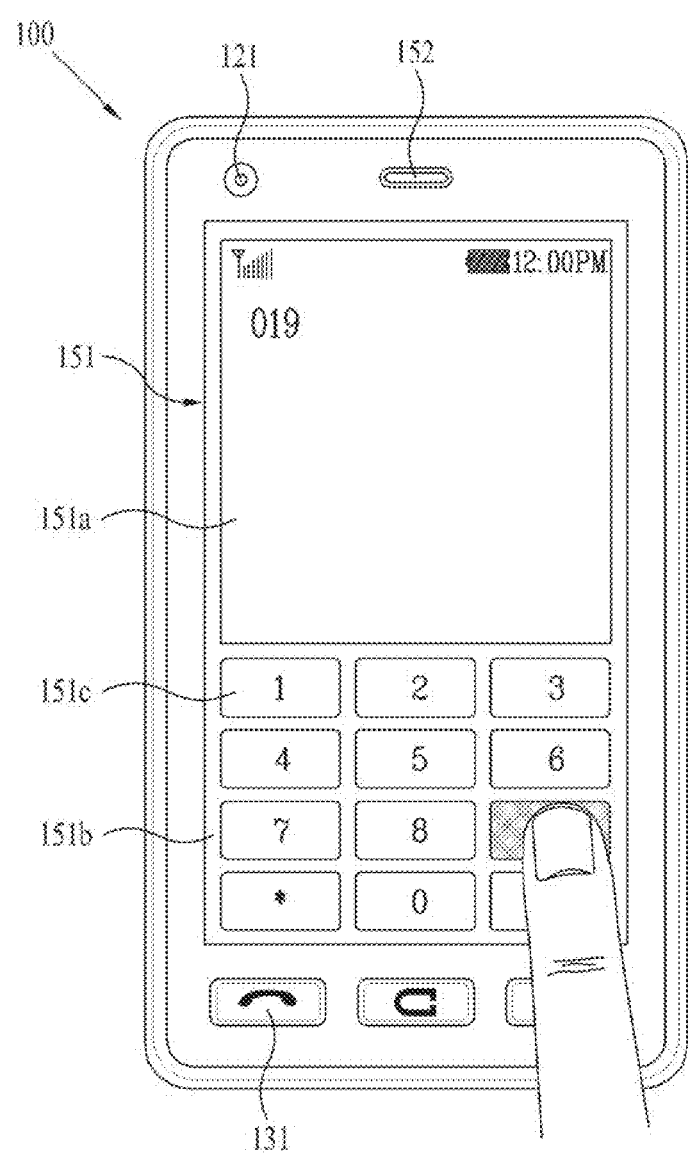
FIG. 3A and FIG. 3B are front diagrams of a mobile terminal for explaining an operational status of the mobile terminal.

FIG. 3A shows that a touch applied to a soft key 151c is inputted through a front face of a terminal body.

The display unit 151 is operable through a single, entire area or by being divided into a plurality of regions. In the latter case, a plurality of the regions can be configured to be interoperable.

For example, an output window 151a and an input window 151b are displayed on the display unit 151. A soft key 151c' representing a digit for inputting a phone number or other item is outputted to the input window 151b. If the soft key 151c' is touched, a digit corresponding to the touched soft key is outputted to the output window 151a. If the first manipulating unit 131 is manipulated, a call connection for the phone number displayed on the output window 151a is attempted.

Figure 3B:
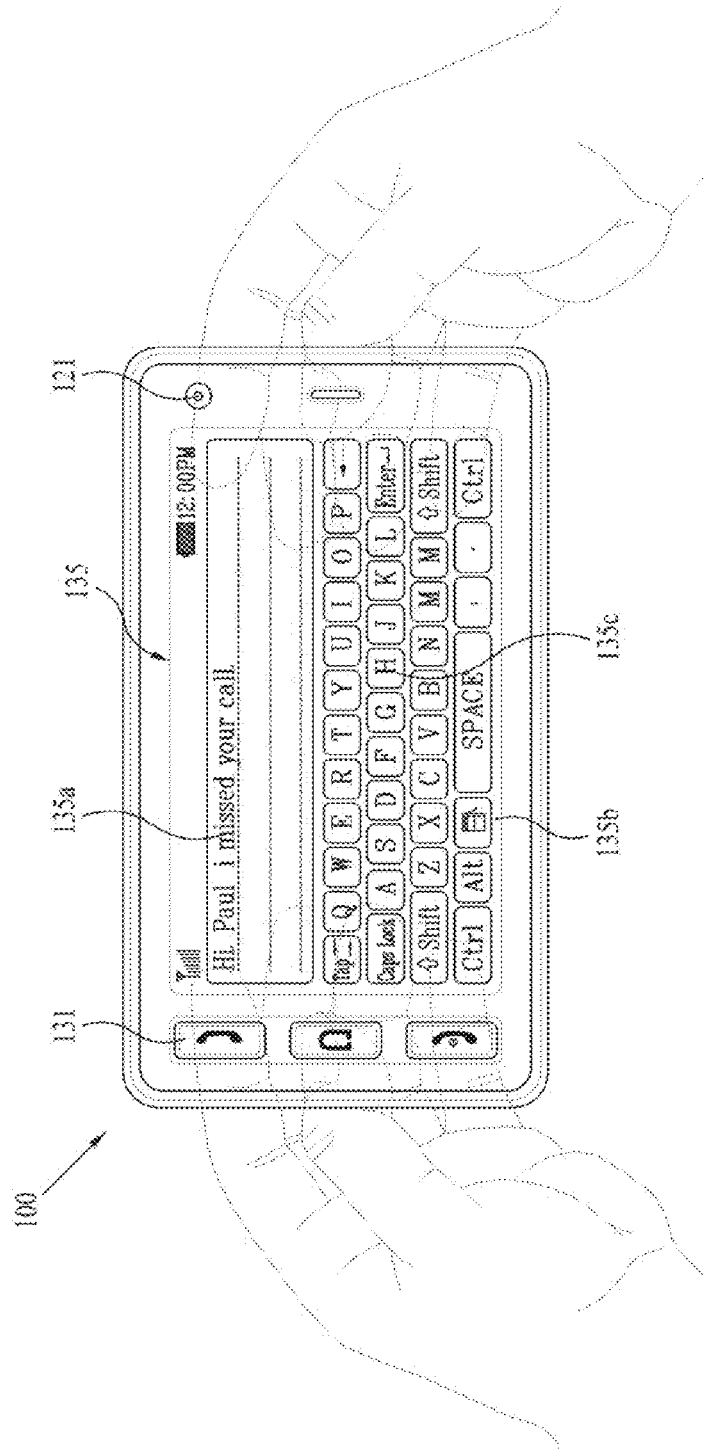

FIG. 3B shows that a touch applied to a soft key 135c is inputted through a rear face of a terminal body. For purposes of example only, FIG. 3A depicts the display on the display unit 151 in a vertical arrangement, or portrait mode, whereas FIG. 3B depicts the display on the touchpad 135 in a horizontal arrangement, or landscape mode. The display unit 151 and the touchpad 135 may be configured to change an output picture according to the orientation of the terminal body.

FIG. 3B depicts a text input mode that is activated in the terminal. An output window 135a and an input window 135b are displayed on the touchpad 135. A plurality of soft keys 135c representing at least one of characters, symbols, digits, or other input items can be arranged in the input window 135b. The soft keys 135c can be arranged in the QWERTY key formation.

If the soft keys 135c are touched through the touchpad 135, the characters, symbols, digits, or other input items that correspond to the touched soft keys are outputted to the output window 135a. Thus, the touch input via the touchpad 135 is advantageous in that the soft keys 135c may be prevented from being blocked by a finger in case of touch, when compared to the touch input via the display unit 151. In case the display unit 151 and the touchpad 135 are configured to be transparent, it is able to visually check fingers located at the backside of the terminal body. Hence, more correct touch inputs are possible.

The display unit 151 and/or the touchpad 135 may be configured to receive a touch input via scrolling. A user scrolls the display unit 151 or the touchpad 135 to shift a cursor or pointer located at an entity, such as an icon or other entity, displayed on the display unit 151. Furthermore, if a finger is shifted on the display unit 151 or the touchpad 135, a path of the shifted finger may be visually displayed on the display unit 151. This may be useful in editing an image that is displayed on the display unit 151.

To cope with a case where both the display unit 151, or touchscreen, and the touchpad 135 are touched simultaneously or within a predetermined time range, the terminal may be limited to executing only one function. The above case of the simultaneous touch may correspond to a case where the terminal body is held by a user in a clamping manner, such as using a thumb and a first finger. The executed function may include activation or deactivation for the display unit 151 or the touchpad 135.

The proximity sensor 141 described with reference to FIG. 1 is explained in detail with reference to FIG. 4 as follows. A pointer, such as a user's finger, a pen, a stylus, or other pointer known in the art, approaches the touchscreen, a proximity sensor 141 provided within the touchscreen, or in the vicinity of the touchscreen, detects the approach of the pointer and outputs a proximity signal.

The proximity sensor 141 may be configured to output a different proximity signal according to a proximity depth, such as a distance between the pointer and the proximity-touched touchscreen.

Figure 4:
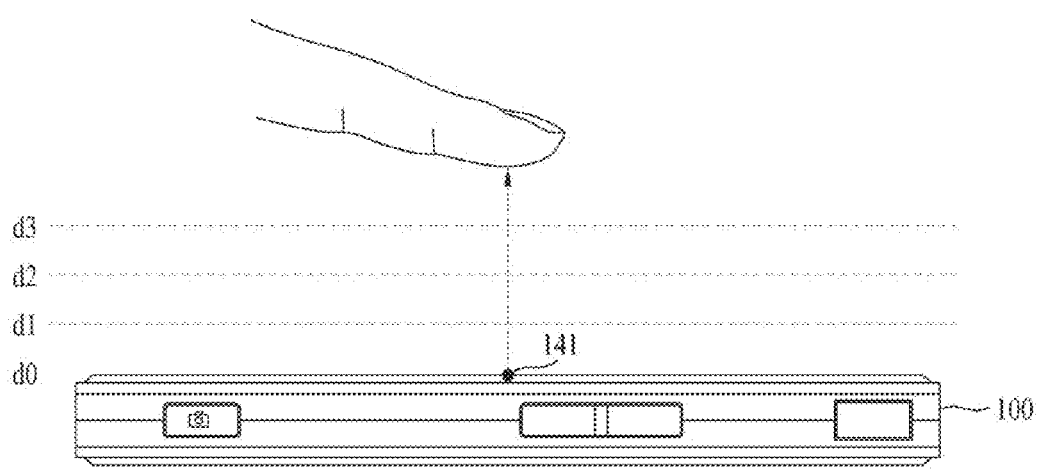
FIG. 4 is a diagram to explain the concept of proximity depth of a proximity sensor.

With continued reference to FIG. 4, for purposes of example only, a cross-section of the touchscreen provided with a proximity sensor capable of three proximity depths is depicted. It is understood that a proximity sensor capable of proximity depths amounting to a number smaller than 3 or greater than 3 is possible.

More particularly, when the pointer physically contacts the touchscreen (d0), it is recognized as a contact touch. When the pointer is detected to be spaced a distance from the touchscreen that is smaller than d1, it is recognized as a proximity touch to a first proximity depth. When the pointer is detected to be spaced a distance from the touchscreen that is smaller than d2 and equal to or greater than d1, it is recognized as a proximity touch to a second proximity depth. When the pointer is detected to be spaced a distance from the touchscreen that is smaller than d3 and equal to or greater than d2, it is recognized as a proximity touch to a third proximity depth. When the pointer is detected to be spaced a distance from the touchscreen that is equal to or greater than d3, it is recognized as a proximity touch being released.

Hence, the controller 180 is able to recognize the proximity touch as one of various input signals according to the proximity depth and position of the pointer. The controller 180 is able to perform various operations according to the various input signals.

Figure 5:
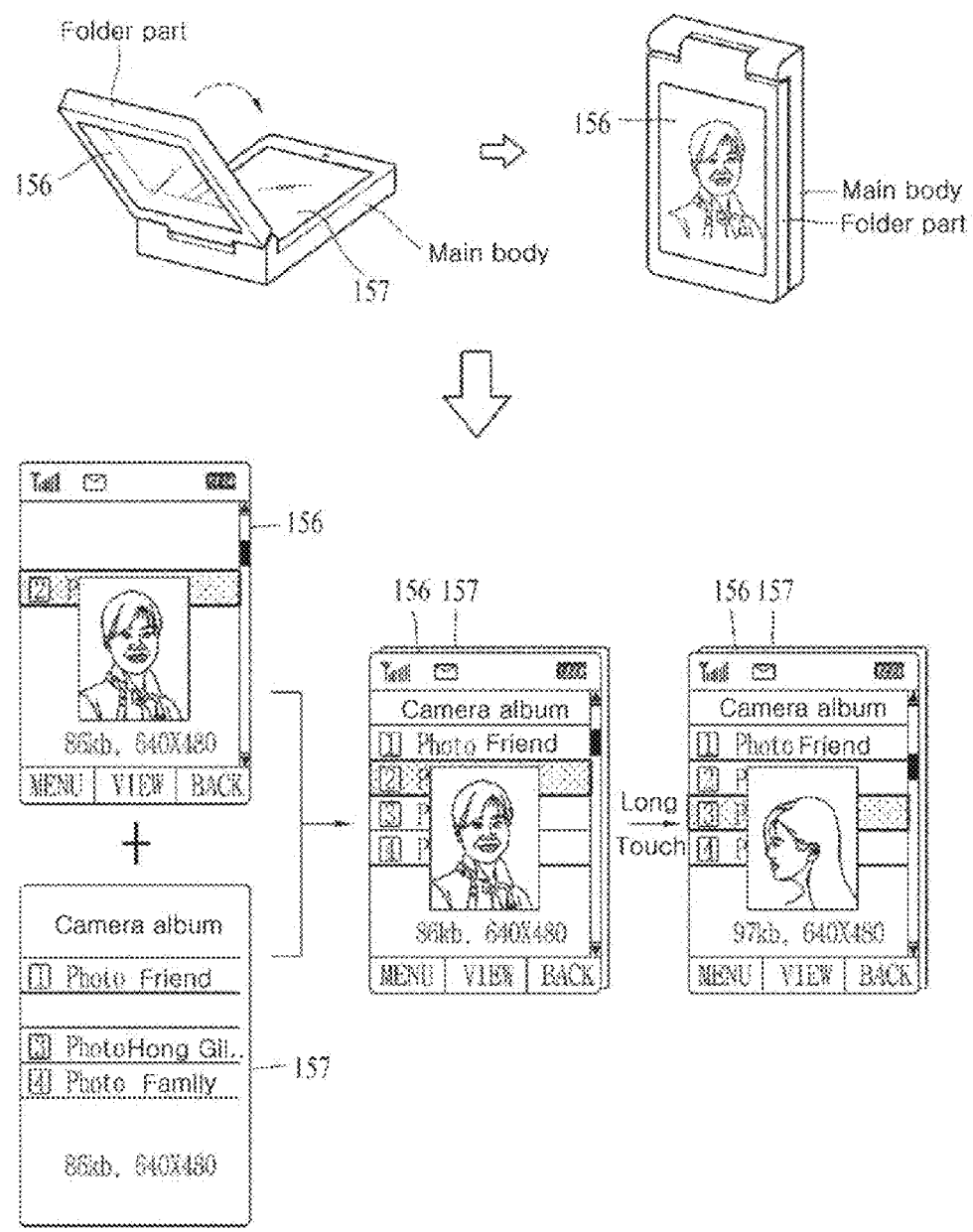
FIG. 5 is a diagram showing a method of controlling a touch action on a pair of display units overlapped with each other.

FIG. 5 depicts a diagram of a method of controlling a touch action in a state where a pair of display units 156 and 157 overlap each other.

Referring to FIG. 5, a terminal shown in the drawing is a folder-type terminal in which a folder part is connected to a main body in a manner of being folded or unfolded.

A first display unit 156 provided in the folder part is a light-transmissive or transparent type, such as a TOLED, while a second display unit 157 provided in the main body may be a non-transmissive type, such as a LCD. Each of the first and second display units 156 and 157 may include a touch-inputable touchscreen.

If a touch, such as a contact touch or a proximity touch, to the first display unit or TOLED 156 is detected, the controller 180 selects or runs at least one image from an image list displayed on the TOLED 156 according to a touch type and a touch duration.

For purposes of example, the following description explains a method of controlling information displayed on a different display unit, or an LCD 157, where a TOLED 156 that is externally exposed in an overlapped configuration is touched. The description is made with reference to input types classified into a touch, a long touch, a long-touch and drag, and the like.

In the overlapped state, such as a state where the mobile terminal is closed or folded, the TOLED 156 is configured to overlap the LCD 157. In this state, if a touch different from a touch for controlling an image displayed on the TOLED 156, such as a long touch, is detected, the controller 180 enables at least one image to be selected from an image list displayed on the LCD 157 according to the touch input. A long touch may be a touch having a duration of at least 2 seconds. The result from running the selected image is displayed on the TOLED 156. The long touch is usable in selectively shifting a specific entity displayed on the LCD 157 to the TOLED 156 without an action for running the corresponding entity. In particular, if a user performs a long touch on a prescribed region of the TOLED 156 that corresponds to a specific entity of the LCD 157, the controller 180 controls the corresponding entity to be displayed by being shifted to the TOLED 156.

Meanwhile, an entity displayed on the TOLED 156 may be displayed by being shifted to the LCD 157 according to a prescribed touch input to the TOLED 156, such as flicking, swirling, or other prescribed touch method. A second menu displayed on the LCD 157 may be displayed by being shifted to the TOLED 156.

When another input, such as a drag, is detected together with a long touch, the controller 180 may execute a function associated with an image selected by the long touch so that a preview picture for the image may be displayed, for example, on the TOLED 156. As an example, a preview, shown in FIG. 5 as a picture of a male,) for a second menu, shown in FIG. 5 as an image file, may be performed.

While the preview image is outputted, if a drag toward a different image is performed on the TOLED 156 by maintaining the long touch, the controller 180 shifts a selection cursor, such as a selection bar, of the LCD 157 and displays the image selected by the selection cursor on the preview picture, depicted in FIG. 5 as a picture of a female. Thereafter, after completion of the touch, such as the long touch and drag, the controller 180 displays the initial image selected by the long touch.

The touch action, such as the long touch and drag, is identically applied to a case where a slide, such as an action of a proximity touch corresponding to the drag, is detected together with a long proximity touch, such as a proximity touch maintained for at least 2 or 3 seconds, to the TOLED 156.

When a touch action differing from the above-mentioned touch actions is detected, the controller 180 is able to operate in the same manner of the general touch controlling method.

The method of controlling the touch action in the overlapped state is also applicable to a terminal having a single display. The method of controlling the touch action in the overlapped state is also applicable to terminals differing from the folder-type terminal having a dual display as well.

Figure 6A:
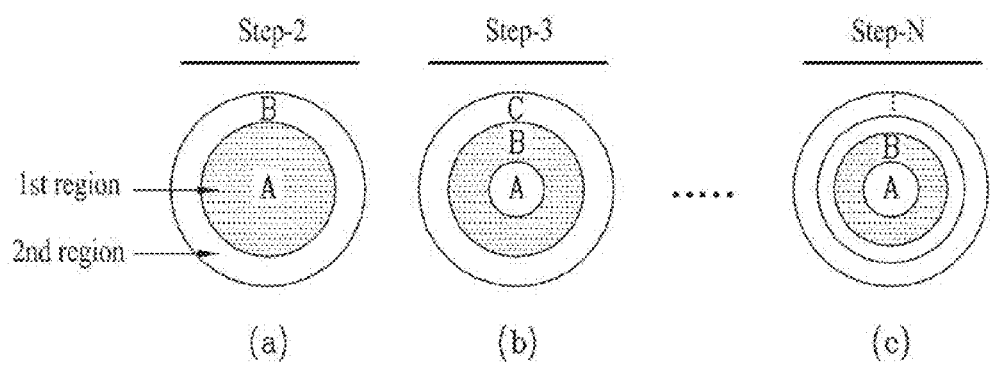
FIG. 6A and FIG. 6B are diagrams showing proximity touch recognizing area for detecting a proximity signal and a haptic area for generating a tactile effect, respectively.

FIG. 6A represents an object, such as an icon, a menu item and the like as a circle for purposes of example. A region for displaying an object on the display unit 151, as shown in (a) of FIG. 6A, may be divided into a first region A at a central part and a second region B, which encloses the first region A. The first region A and the second region B may be configured to generate tactile effects that differ from each other in strength or pattern. For example, the first region A and the second region B may be configured to generate two-step vibrations in a manner of outputting a first vibration if the second region B is touched and outputting a second vibration greater than the first vibration if the first region A is touched.

When both the proximity touch recognition region and the haptic region are simultaneously set in the region having the object displayed therein, the controller 180 is capable of setting the haptic region for generating the tactile effect to be different from the proximity touch recognition region for detecting the proximity signal. In particular, the controller is capable of setting the haptic region to be narrower or wider than the proximity touch recognition region. For example, in (a) of FIG. 6A, the controller is capable of setting the proximity touch recognition region to the area including both of the first and second regions A and B. The controller is also capable of setting the haptic region to the first region A.

The controller 180 is capable of discriminating the region having the object displayed therein into three regions A, B and C as shown in (b) of FIG. 6A. Alternatively, the controller 180 is capable of discriminating the region having the object displayed therein into N regions, with N being greater than 3, as shown in (c) of FIG. 6A. The controller 180 is capable of configuring each of the divided regions to generate a tactile effect having a different strength or pattern. Where a region having a single object represented therein is divided into at least three regions, the controller 180 is capable of setting the haptic region and the proximity touch recognition region to differ from each other according to a use environment.

Figure 6B:
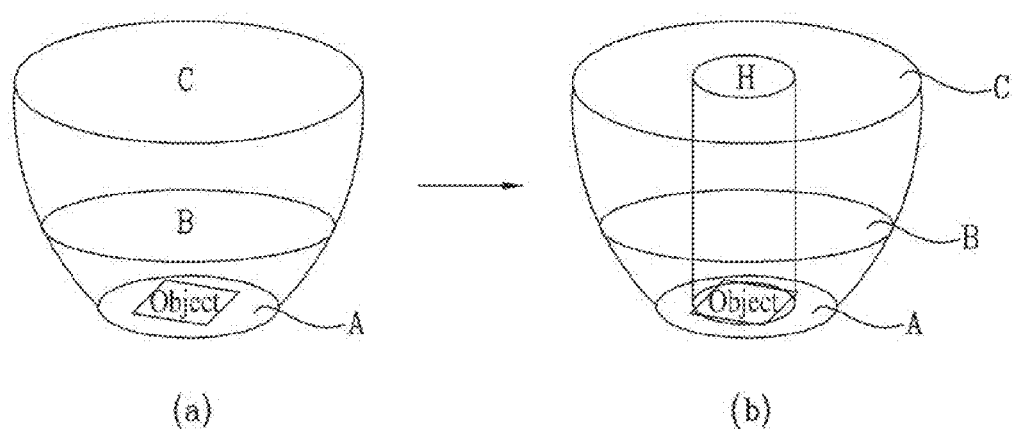

The controller 180 is capable of configuring a size of the proximity touch recognition region of the display unit 151 to vary according to a proximity depth. In particular, referring to (a) of FIG. 6B, the proximity touch recognition region is configured to decrease by C→B→A according to the proximity depth for the display unit 151. Alternatively, the proximity touch recognition region may be configured to increase by C→B→A according to the proximity depth for the display unit 151. Despite the above configuration, the controller 180 is capable of setting the haptic region to have a predetermined size, as the region 'H' shown in (b) of FIG. 6B, regardless of the proximity depth for the display unit 151.

When dividing the object-displayed region for the setting of the haptic region or the proximity touch recognition region, the controller 180 is capable of using one of various schemes of horizontal/vertical division, radial division, and combinations thereof, as well as the concentric circle type division shown in FIG. 6A.

For purposes of example, in the following description, an object may include a web page downloaded via wireless Internet. The object may include a document file having order information or a plurality of web pages. The document file may include one of a .txt file, a .pdf file, a .doc file, or other type of document file.

Figure 7:
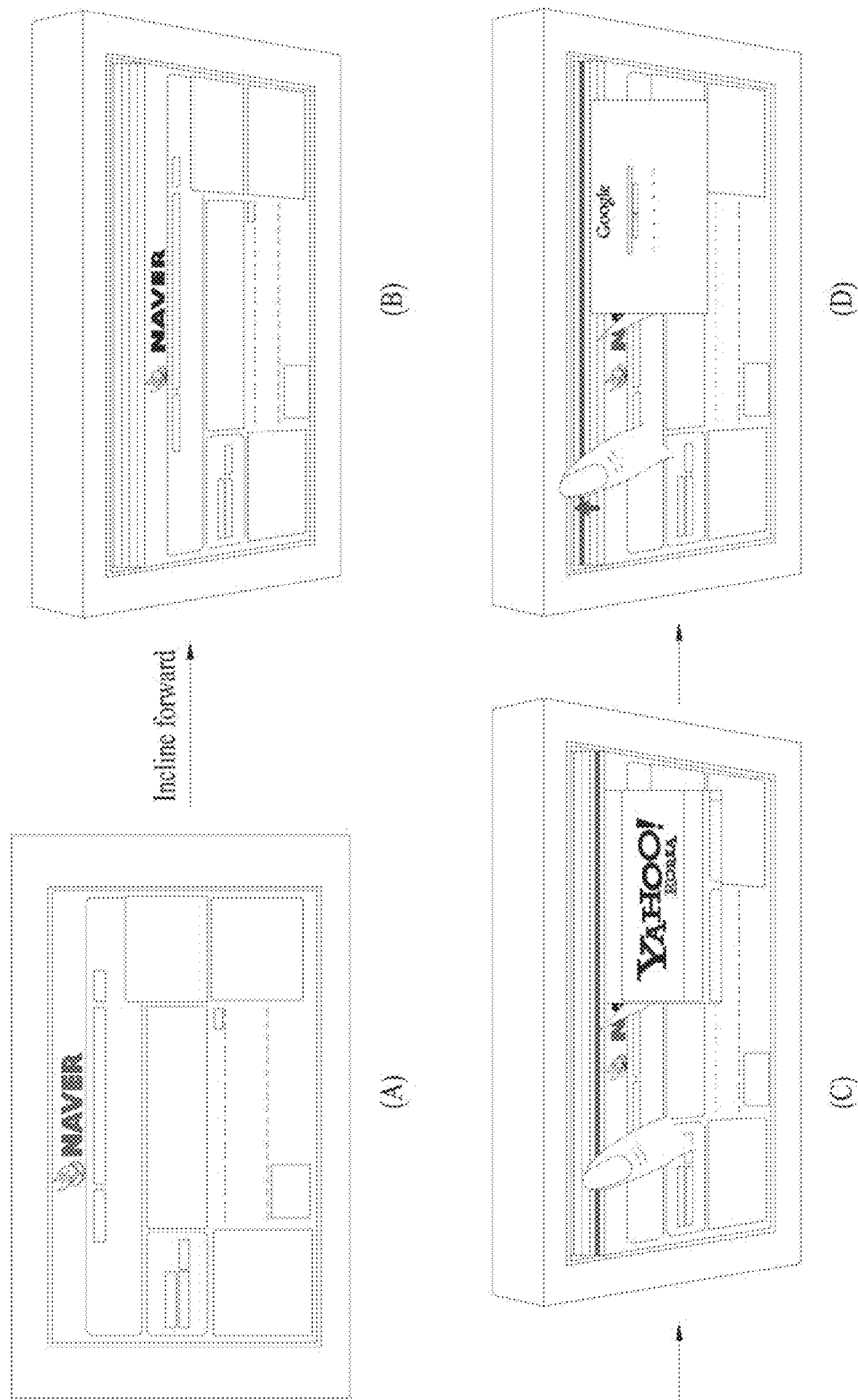
FIG. 7 is a diagram of a screen for a method of displaying an object.

In (A) of FIG. 7, wireless Internet is accessed using a mobile communication terminal.

In (B) of FIG. 7, a terminal is tilted or inclined forward. A tilt inclination sensor or a gyroscope, hereinafter referred to as an inclination sensor 142, for performing a sensing action according to gravity is provided within the terminal. The inclination sensor 142 is capable of detecting when the mobile terminal 100 is rotated or tilted away from a predetermined reference plane, as well as the degree of tilt or inclination. The reference plane is defined as a plane at which the mobile terminal 100 remains substantially parallel for a threshold time period. According to the detection of the inclination sensor, a page list is displayed three-dimensionally as a thickness plane of pages of a book in a tilted or inclined direction of the terminal. A front page, or active object, is depicted at the front of the display and a plurality of pages, or inactive objects, is depicted to be behind the front page. The number of selectable inactive objects that is displayed may be modified based upon the degree of tilt of the mobile terminal.

In (C) of FIG. 7, a proximity touch is performed on the thickness plane while the state shown in (B) is maintained. Once the proximity touch is recognized by enabling a pointer, such as a finger, to approach the thickness plane, a proximity line is activated and may be highlighted as a thick line. The highlighted line corresponds to one of the inactive objects depicted behind the active object. Alternatively, the controller 180 is capable of controlling the proximity line to blink or to be highlighted via other known methods. Information of an object recognized according to the proximity touch may be simultaneously displayed. In this case, complete or partial information about the object may be displayed as a speech balloon, a thumbnail-size browser, a pop-up object, or as other display methods known in the art. In the case where a thumbnail or pop-up object is displayed, the thumbnail or pop-up object may include less data than what is displayed when the highlighted object is an active object. Additionally, the pop-up object may be displayed smaller than when the highlighted object is an active object.

Referring to (D) of FIG. 7, while the proximity touch is maintained, if the pointer, such as the finger, is moved up and down over the thickness plane, information about the object recognized according to the proximity touch is displayed via a speech balloon, a thumbnail, a pop-up object, or as other display methods known in the art.

Figure 8:
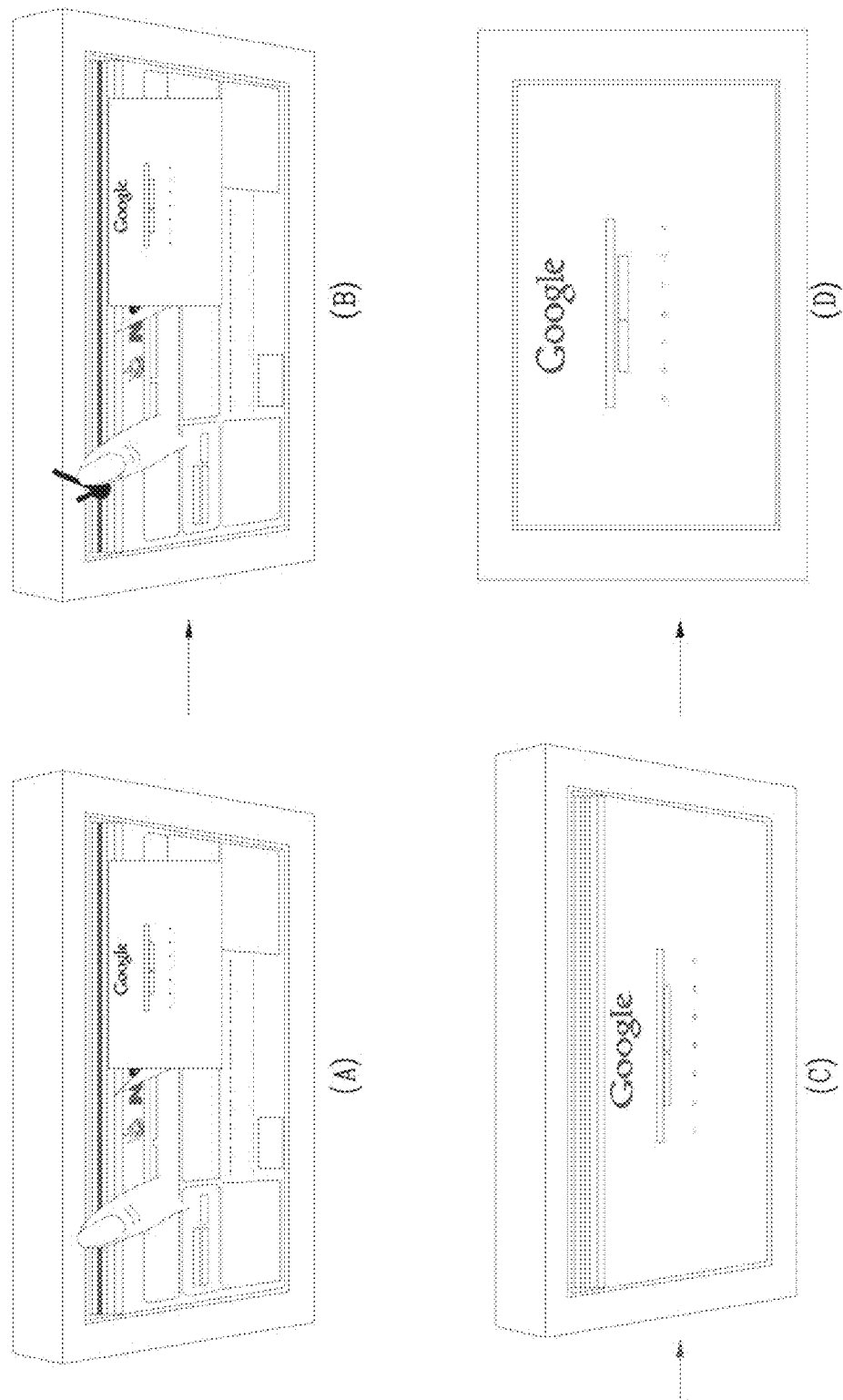
FIG. 8 is a diagram of a screen for a method of displaying an object.

Referring to (A) of FIG. 8, while a terminal is tilted or inclined, a proximity touch is performed on a thickness plane of a book, thereby highlighting an inactive object.

While a highlighted line of the thickness plane and a thumbnail are activated, if a proximity-touching finger approaches the thickness plane further, a contact touch, as shown in (B) of FIG. 8, may be performed. If the contact touch is completed, a picture, such as an active object, on the terminal is switched to a page corresponding to the highlighted line, as shown in (C) of FIG. 8. In this manner, the originally active object is deactivated and the highlighted object becomes the active object. The new, presently active object is reordered relative to the newly deactivated object and the remaining ones of the plurality of inactive objects. Reordering of the new, presently active object may occur in response to a drag and drop operation performed on the new, presently active object. The deactivation and activation may occur in any order.

Subsequently, if the body of the tilted/inclined terminal returns to its original position, a normal picture appears as shown in (D) of FIG. 8. While a proximity touch is maintained, if a contact touch is performed, a display action of a corresponding object may be performed.

Figure 9:
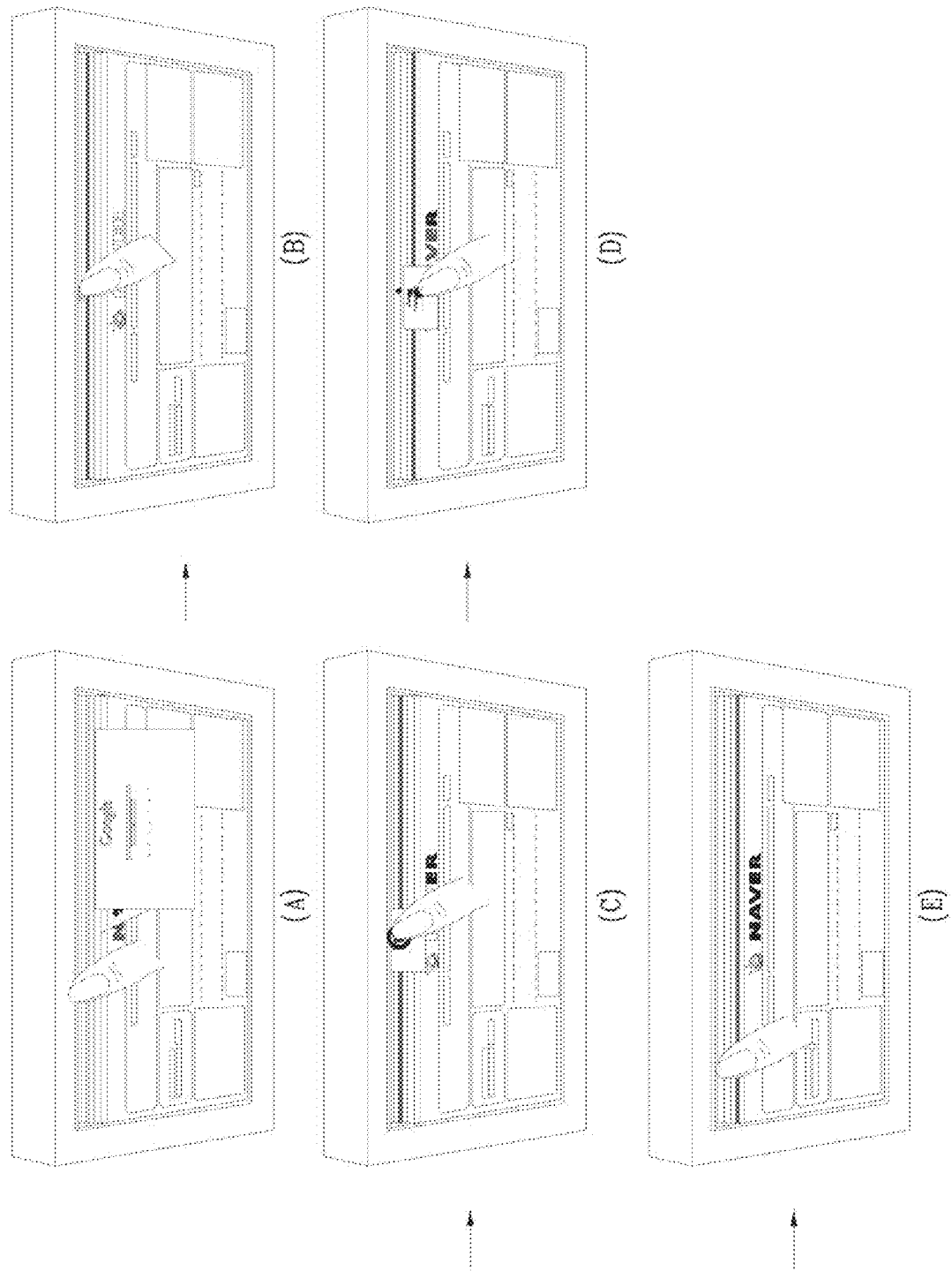
FIG. 9 is a diagram of a screen for a method of displaying an object.

Referring to (A) of FIG. 9, while a terminal is tilted or inclined, a proximity touch is performed on a thickness plane of a book. Thus, while a line of the thickness plane and a thumbnail are activated, if a proximity-touching finger approaches the thickness plane further, a contact touch, as shown in (B) of FIG. 9, may be performed and the finger is held as it is.

In this case, a preview picture displayed as a thumbnail, a pop-up object or a speech balloon is reduced in size, as shown in (C) of FIG. 9, and is then changed into a shape that is attached to a tip of the finger contact-touched to the thickness plane.

Subsequently, the finger is moved on the thickness plane. In particular, if a drag and drop action is performed, the corresponding object is shifted to a position where the contact touch is released. In this case, referring to (D) of FIG. 9, current position information of the object shifted by the drag action is represented as a thickness of the line. Namely, unlike (A), (B) and (C) of FIG. 9, (D) of FIG. 9 illustrates that the currently located object is represented as a thick line to indicate that the current position of the dragged object has been shifted after the contact touch.

After the object has been shifted, if a proximity touch, as shown in (E) of FIG. 9, is performed, confirmation that the object has been shifted can be displayed. For example, the web page 'GOOGLE' was located on a last line in the state shown in (A) of FIG. 9. If the web page is shifted as shown in (D) of FIG. 9 through the contact touch→holding→drag actions, it can be observed that it is located on a line right next to a current active page, as depicted in (E) of FIG. 9.

A thumbnail may be displayed in response to detecting a proximity touch relative to the highlighted object. The thumbnail may include data that is related to the highlighted object. If a thickness plane of remaining ones of the plurality of inactive objects is scrolled while a proximity touch relative to the remaining ones of the plurality of inactive objects is maintained, a thumbnail corresponding to a highlighted object of the plurality of inactive objects is displayed.

As mentioned in the foregoing description, if a plurality of data are configured in order, an object displaying method is able to represent the corresponding object in various forms. For example, the object can include a web page having been accessed via wireless Internet or a document file stored in a terminal. In the description of the following flowchart (FIG. 10), as an example, an object may be a web page driven by wireless Internet. Each of the selectable plurality of inactive objects may be associated with one of a webpage, document, photograph or video.

Figure 10:
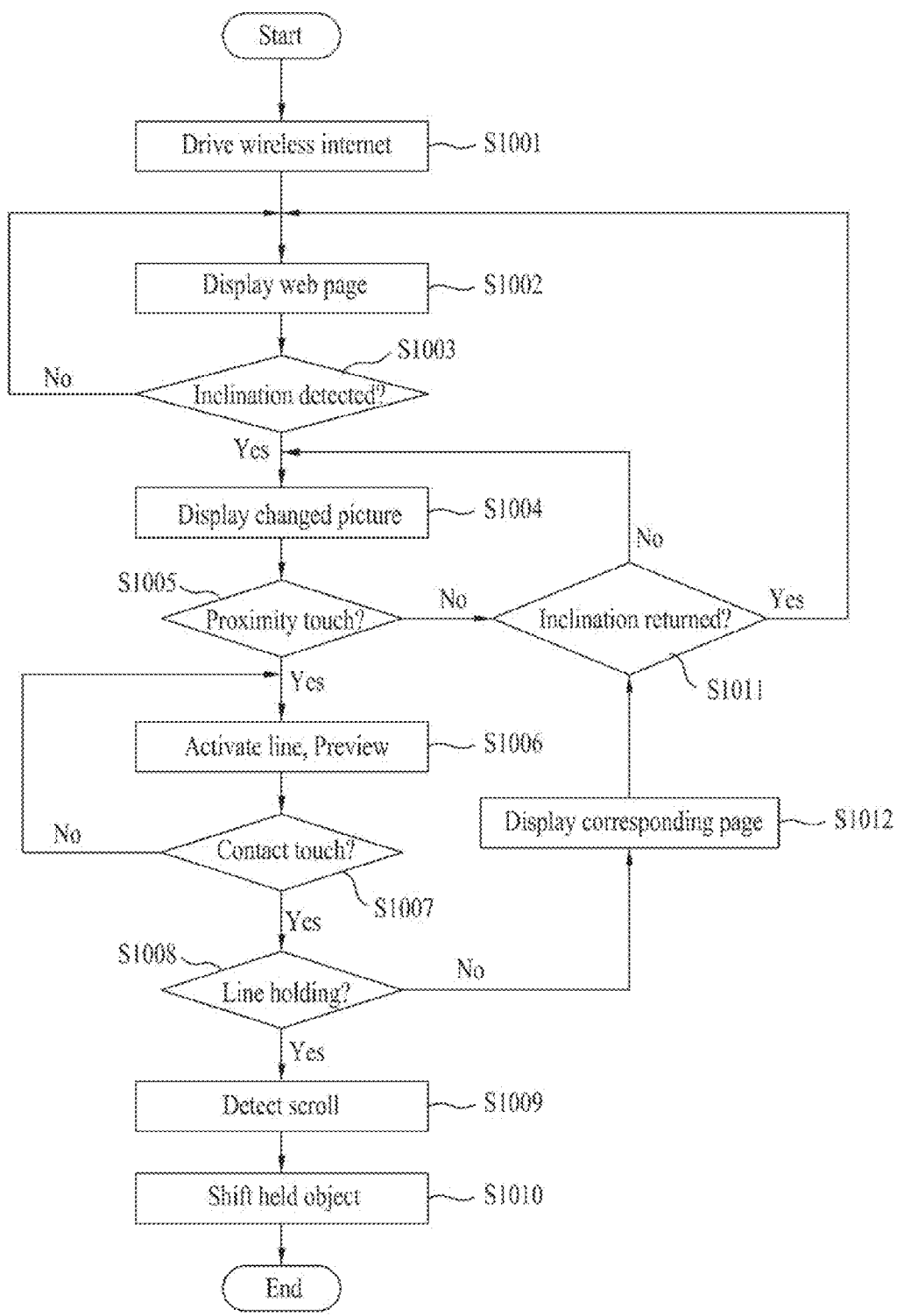
FIG. 10 is a flowchart of a method of displaying an object using a mobile communication terminal.

Referring to FIG. 10, a wireless Internet is driven by accessing the Internet via a wireless Internet module included in a wireless communication unit [S1001].

Subsequently, a web page is displayed on a display unit using data provided by an Internet server [S1002].

A determination of whether a terminal body is tilted/inclined is then made. Generally, a device having a play function, such as an MP3 player, a PMP player, and the like, may be provided with a hold function. The hold function prevents a play action or other functions from being driven by a user's unintentional contact. When a user attempts to view order of objects three-dimensionally in the same shape of a currently displayed object by tilting or inclining a body, the hold function may be released. Otherwise, if the hold function is maintained, the operation of the present invention is not performed despite the terminal body being tilted/inclined. This is to prevent a screen from being changed by the body inclination that is not intended by the user [S1003].

While the hold function is released, if the inclination of the body is detected, a picture is displayed in a manner of being tilted/inclined in the direction of the body inclination. If the terminal is tilted/inclined forward, away from a user, a page list is displayed in an upper part of the terminal. If the terminal is tilted/inclined to the left, away from a user, a page list is displayed on a right part of the terminal. Therefore, a three-dimensional effect can be expected [S1004]. The plurality of selectable inactive objects may be displayed along a side of the display that experiences the greatest amount of tilt relative to the reference plane.

Subsequently, it is detected whether a proximity touch is performed on the page list [S1005].

If the proximity touch is not performed and the terminal returns to an original state, a normal web page display action is entered [S1011].

If the proximity touch to the page list is detected, a line corresponding to a thickness plane of a proximity-touched object is displayed thick and a preview picture of the corresponding object is displayed. In doing so, a blinking action for a proximity line may be activated [S1006].

Thus, while the line is displayed thick by the proximity touch and a thumbnail image is activated, it is detected whether a contact touch, such as a direct touch, is performed [S1007].

If the contact touch is performed, a presence or non-presence of a line holding is detected [S1008]. If the line holding is not performed and a proximity touch is released right after the contact touch, a page of the corresponding object is displayed [S1012].

If the line holding is detected, a thumbnail is displayed in a small manner in the vicinity of a finger. A motion of the finger is then detected. In particular, a scroll is detected while the contact touch is maintained [S1009].

After completion of a drag and drop action, the contact-touched object is shifted to a drop-completed position [S1010].

The above-described method may be implemented in a program recorded medium as computer-readable codes. The computer-readable media includes all kinds of recording devices in which data readable by a computer system is stored. The computer-readable media includes ROM, RAM, CD-ROM, magnetic tapes, floppy discs, optical data storage devices, and other storage devices known in the art, and also includes carrier-wave type implementations such as transmission via the Internet.

Accordingly, embodiments of the present invention provide some or all of the following effects and/or advantages.

First of all, one embodiment of the present invention enables information of a stored object to be previewed.

A second embodiment facilitates changing the order of information of a stored object.

A third embodiment displays a page list as a book thickness plane if a terminal is tilted/inclined, thereby providing a three-dimensional effect.

The foregoing embodiments and advantages are merely exemplary and are not to be construed as limiting the present invention. The present teaching can be readily applied to other types of apparatuses and processes. The description of the present invention is intended to be illustrative, and not to limit the scope of the claims. Many alternatives, modifications, and variations will be apparent to those skilled in the art.

What is claimed is:

1. A display method for a mobile terminal, the method comprising:

displaying an active object on a display of a mobile terminal, wherein the active object is manipulable in response to a user input;

detecting a degree of tilt of the mobile terminal from an original position relative to a reference plane;

displaying a selectable plurality of inactive objects together with the active object on the display in response to the detecting of the degree of tilt, wherein each of the plurality of inactive objects is depicted as a line represented to be positioned behind the active object and the plurality of inactive objects are arranged in order;

highlighting an object of the plurality of inactive objects responsive to a received touch input relative to an associated one of the plurality of inactive objects;

deactivating the active object and displaying the highlighted object as a presently active object on the display responsive to a received touch input relative to the highlighted object;

displaying the deactivated object as a line represented to be positioned behind the presently active object and arranged in order with other of the plurality of inactive objects;

detecting a return of the mobile terminal substantially to the original position; and stopping displaying the deactivated object and other of the plurality of inactive objects while maintaining displaying of the presently active object based upon the detection of the return of the mobile terminal substantially to the original position.

2. The method according to claim 1, wherein the detecting the degree of tilt is based upon data provided by a tilt inclination sensor or a gyroscope.

3. The method according to claim 1, further comprising:
modifying a number of the displayed selectable plurality of inactive objects based upon the degree of tilt of the mobile terminal.

4. The method according to claim 1, further comprising:
displaying the selectable plurality of inactive objects along a side of the display experiencing a greatest amount of the degree of tilt relative to the reference plane.

5. The method according to claim 1, further comprising:
providing repositioning of the highlighted object relative to other ones of the plurality of inactive objects responsive to the user touch input relative to the highlighted object.

6. The method according to claim 1, further comprising:
displaying a pop-up object that is associated with the highlighted object, the pop-up object comprising data that is less than what is displayed when the highlighted object is an active object.

7. The method according to claim 1, further comprising:
displaying a pop-up object that is associated with the highlighted object, the pop-up object comprising data that is smaller in size than what is displayed when the highlighted object is an active object.

8. The method according to claim 1, further comprising:
displaying a thumbnail that is associated with the highlighted object together with the active object.

9. The method according to claim 1, wherein each of the selectable plurality of inactive objects is associated with one of a webpage, document, photo, or video.

10. The method according to claim 1, wherein the reference plane is defined by a plane at which the mobile terminal remains substantially parallel for a threshold time period.

11. The method according to claim 1, further comprising:
displaying a thumbnail responsive to detecting a proximity touch relative to the highlighted object, the thumbnail comprising data that is related to the highlighted object, and wherein if a thickness plane of remaining ones of the plurality of inactive objects is scrolled while a proximity touch relative to the remaining ones of the plurality of inactive objects is maintained, a thumbnail corresponding to a highlighted object of the plurality of inactive objects is displayed.

12. The method according to claim 1, wherein after the deactivating of the active object and the displaying of the highlighted object, the method further comprises:
reordering of the presently active object relative to the deactivated object and remaining ones of the plurality of inactive objects.

13. The method according to claim 12, wherein the reordering of the presently active object occurs responsive to a drag and drop operation performed on the presently active object.

14. A mobile terminal, comprising:
a display configured to display an active object, wherein the active object is manipulable in response to a user input; and
a controller configured to:
detect a degree of tilt of the mobile terminal relative to a reference plane;
control the display to display a selectable plurality of inactive objects together with the active object on the display in response to the detecting of the degree of tilt, wherein each of the plurality of inactive objects is depicted as a line represented to be positioned behind the active object and the plurality of inactive objects are arranged in order;
control the display to highlight an object of the plurality of inactive objects in response to receipt of a touch input relative to an associated one of the plurality of inactive objects;
deactivate the active object and control the display to display the highlighted object as a presently active object in response to a received touch input relative to the highlighted object;
control the display to display the deactivated object as a line represented to be positioned behind the presently active object and arranged in order with other of the plurality of inactive objects;
detect a return of the mobile terminal substantially to the original position; and
control the display to stop displaying the deactivated object and other of the plurality of inactive objects while maintaining displaying of the presently active object based upon the detection of the return of the mobile terminal substantially to the original position.

15. The mobile terminal of claim 14, further comprising:
a tilt sensor or a gyroscope,
wherein the controller is further configured to detect the degree of tilt based upon data provided by the tilt sensor or the gyroscope.

16. The mobile terminal of claim 14, wherein the controller is further configured to modify a number of the displayed selectable plurality of inactive objects based upon the degree of tilt of the mobile terminal.

17. The mobile terminal of claim 14, wherein the controller is further configured to display the selectable plurality of inactive objects along a side of the display experiencing a greatest amount of the degree of tilt relative to the reference plane.

18. The mobile terminal of claim 14, wherein the controller is further configured to provide repositioning of the highlighted object relative to other ones of the plurality of inactive objects in response to the touch input relative to the highlighted object.

19. The mobile terminal of claim 14, wherein the controller is further configured to display a pop-up object that is associated with the highlighted object, the pop-up object comprising data that is less than what is displayed when the highlighted object is an active object.

20. The mobile terminal of claim 14, wherein the controller is further configured to display a pop-up object that is associated with the highlighted object, the pop-up object comprising data that is smaller in size than what is displayed when the highlighted object is an active object.

21. The mobile terminal of claim 14, wherein the controller is further configured to control the display to display a thumbnail that is associated with the highlighted object together with the active object.

22. The mobile terminal of claim 14, wherein each of the selectable plurality of inactive objects is associated with one of a webpage, document, photo, or video.

23. The mobile terminal of claim 14, wherein the reference plane is defined by a plane at which the mobile terminal remains substantially parallel for a threshold time period.

24. The mobile terminal of claim 14, wherein the controller is further configured to display a thumbnail in response to detecting a proximity touch relative to the highlighted object, the thumbnail comprising data that is related to the highlighted object, and wherein if a thickness plane of remaining ones of the plurality of inactive objects is scrolled while a proximity touch relative to the remaining ones of the plurality of inactive objects is maintained, a thumbnail corresponding to a highlighted object of the plurality of inactive objects is displayed.

25. The mobile terminal of claim 14, wherein the controller is further configured to:
    deactivate the active object;
    display the highlighted object; and
    reorder the presently active object relative to the deactivated object and remaining ones of the plurality of inactive objects.

26. The mobile terminal of claim 14, wherein the controller is further configured to reorder the presently active object in response to a drag and drop operation performed on the presently active object.

* * * * *